US005864936A

United States Patent [19]

Riley et al.

[11] Patent Number: 5,864,936

[45] Date of Patent: *Feb. 2, 1999

[54] METHOD OF PROVIDING AND INSTALLING A DOOR LATCHING STRUCTURE

[75] Inventors: Rory M. Riley, Santa Ana; Masoud S. Miresmaili, Covina, both of Calif.

[73] Assignee: Adams Rite Manufacturing Co., City of Industry, Calif.

[ * ] Notice: The term of this patent shall not extend beyond the expiration date of Pat. No. 5,688,002.

[21] Appl. No.: 888,662

[22] Filed: Jul. 7, 1997

Related U.S. Application Data

[63] Continuation of Ser. No. 585,705, Jan. 16, 1996, Pat. No. 5,688,002, which is a continuation-in-part of Ser. No. 349, 744, Dec. 5, 1994, Pat. No. 5,588,686.

[51] Int. Cl.$^{6}$ .................................................. B23P 11/00

[52] U.S. Cl. .............................................. 29/434; 292/92

[58] Field of Search ................................ 29/434; 292/92, 292/21, DIG. 65, DIG. 66

[56] References Cited

U.S. PATENT DOCUMENTS

| | | | |
|---|---|---|---|
| 1,107,736 | 8/1914 | Wilkinson et al. . | |
| 1,186,315 | 6/1916 | Holland . | |
| 1,203,116 | 10/1916 | Hurd . | |
| 1,272,710 | 7/1918 | Ramsher . | |
| 1,302,873 | 5/1919 | Stiff . | |
| 1,330,693 | 2/1920 | Fisher . | |
| 1,516,628 | 11/1924 | Blackwell | 292/171 X |
| 1,529,353 | 3/1925 | Hall | 292/171 X |
| 1,544,960 | 7/1925 | Watts . | |
| 1,638,748 | 8/1927 | Santee . | |
| 2,219,344 | 10/1940 | Taylor | 292/171 X |
| 2,458,751 | 1/1949 | Voight . | |
| 2,597,056 | 5/1952 | Beder . | |
| 2,710,216 | 5/1955 | Eichhacker . | |
| 2,889,164 | 6/1959 | Clark . | |
| 3,281,176 | 10/1966 | McKey . | |
| 4,083,590 | 4/1978 | Folger . | |
| 4,130,306 | 12/1978 | Brkic . | |
| 4,311,329 | 1/1982 | Kral | 292/92 |
| 4,368,905 | 1/1983 | Hirschbein . | |
| 4,458,928 | 7/1984 | Hirschbein . | |
| 4,461,160 | 7/1984 | Van Gompel | 292/171 X |
| 4,534,192 | 8/1985 | Harshbarger et al. . | |
| 4,598,939 | 7/1986 | Krupicka et al. | 292/92 |
| 4,726,613 | 2/1988 | Foshee | 292/167 |
| 4,824,150 | 4/1989 | Smith et al. | 292/92 |
| 4,838,587 | 6/1989 | Choi . | |
| 5,456,243 | 10/1995 | Jones | 292/DIG. 66 X |
| 5,464,259 | 11/1995 | Cohrs | 292/92 X |
| 5,527,074 | 6/1996 | Yeh | 292/177 |

FOREIGN PATENT DOCUMENTS

| | | |
|---|---|---|
| 2080391 | 2/1982 | United Kingdom . |
| 2206641 | 1/1989 | United Kingdom . |
| 2288846 | 1/1995 | United Kingdom . |

*Primary Examiner*—S. Thomas Hughes
*Attorney, Agent, or Firm*—William W. Haefliger

[57] ABSTRACT

A method of providing and installing a door latching structure for operatively interconnecting an upper latching structure carried by a door and a lower actuator structure carried by the door, the upper latching structure located outside the door, and comprising providing a longitudinally elongated link sized for reception within the door and to extend into proximity to the latching structure, and to the actuator structure, the link operatively connected to the actuator structure; and providing a laterally extending link attached to an upper end portion of the longitudinally elongated link, the laterally extending link connectible to the latching structure to transfer longitudinal movement of the longitudinal link effected by the actuator structure to the latching structure, for operating same.

9 Claims, 4 Drawing Sheets

METHOD OF PROVIDING AND INSTALLING A DOOR LATCHING STRUCTURE

This application is a continuation of U.S. Ser. No. 08/585,705 filed Jan. 16, 1996, now U.S. Pat. No. 5,688,002 which is a continuation-in-part of U.S. Ser. No. 08/349,744 filed Dec. 5, 1994 now U.S. Pat. No. 5,588,686.

BACKGROUND OF THE INVENTION

This invention relates generally to a mechanism for deadlocking a door member to a door frame member in such manner as to accommodate sudden opening of the door member as by sudden pushing of an associated panic bar. More particularly, it concerns an external installation and fitting of mechanism, such as a temperature-responsive mechanism, that prevents opening of the door in case of fire.

Safety exit doors are widely used, and they commonly incorporate lock mechanisms which lock the doors to door frames, and which are releasable by operation of panic bars. See U.S. Pat. Nos. 1,638,748; 4,130,306; 4,083,590; and 4,368,905. U.S. Pat. No. 4,838,587 to Choi discloses an improved mechanism for controllably deadlocking a door to a door frame, for panic release.

There is need for simple, compact, reliable mechanisms of this type, which are readily installable externally upon such doors, using elongated actuator links installable within such doors, to thereby provide safety exit door operation, and which also block opening of the exit door in case of fire. There is also need for deadlocking mechanisms wherein only one latch and its operating rod are needed on a door, as adjacent the door top.

SUMMARY OF THE INVENTION

It is a major object of the invention to provide door latching structure for operatively interconnecting an upper latching structure carried by a door and a lower actuator means carried by the door, the upper latching structure located outside the door, comprising, a) a longitudinally elongated link sized for reception within the door and to extend into proximity to the latching structure, and to the actuator means, the link operatively connected to the actuator means, b) and a laterally extending link attached to an upper end portion of the longitudinally elongated link, the laterally extending link connectible to the latching structure to transfer longitudinal movement of the longitudinal link effected by the actuator means to the external latching structure, for operating same.

As will be seen, the elongated link may advantageously comprise a flexible cable easily installed lengthwise in a vertical passage within the door, and easily connectible to the laterally extending link at a location within the door, and also easily connectible to the lower actuator means carried by the door, as at push level. The flexible cable easily accommodates to any irregularities in the central passage.

Another object includes provision of the latching structure, as referred to, and having an element located outside the door, and vertically movable to effect latching to door frame structure, the laterally extending link connected to the element, whereby the laterally extending link extends from within the door to the exterior thereof.

A further object includes provision of a nut integral with the cable, and to which the laterally extending link has threaded attachment, the nut offset laterally from the latching structure, whereby the attachment of the cable to the latching structure is easily accomplished. In addition, the lower actuator means typically has an element to which a lower end portion of the longitudinally elongated link or cable is attached. The lower actuator may include a push bar actuator, or a lever actuator, operated by the user.

Another object is to provide a heat-responsive means to independently control operation of the latching structure in response to a predetermined change in temperature.

It is another object to provide a temperature-responsive blocking means including a spring-urged element and a heat fusible part blocking spring-urged movement of the element into a position to block rod movement that would otherwise unlatch the door.

It is a further object to provide a single rod to extend in cooperation with a single latch mechanism on the door, and to be movable from a first location in which a latch dog is blocked to prevent pivoting of a latch to release a bolt, to a second location in which the dog is unblocked, to allow latch pivoting. The single rod is typically carried by the door member for endwise vertical movement, there being a shoulder on the rod engageable by the temperature responsive blocking means in response to a predetermined increase in ambient temperature, as during a fire. The single rod is normally movable vertically endwise by the cable in the door, the cable, however, typically melting at high temperature during a fire, whereby the rod, which would otherwise drop by gravity action, is prevented from dropping by operation of the temperature responsive blocking means.

These and other objects and advantages of the invention, as well as the details of an illustrative embodiment, will be more fully understood from the following specification and drawings, in which:

DRAWING DESCRIPTION

DETAILED DESCRIPTION

Figure 1:
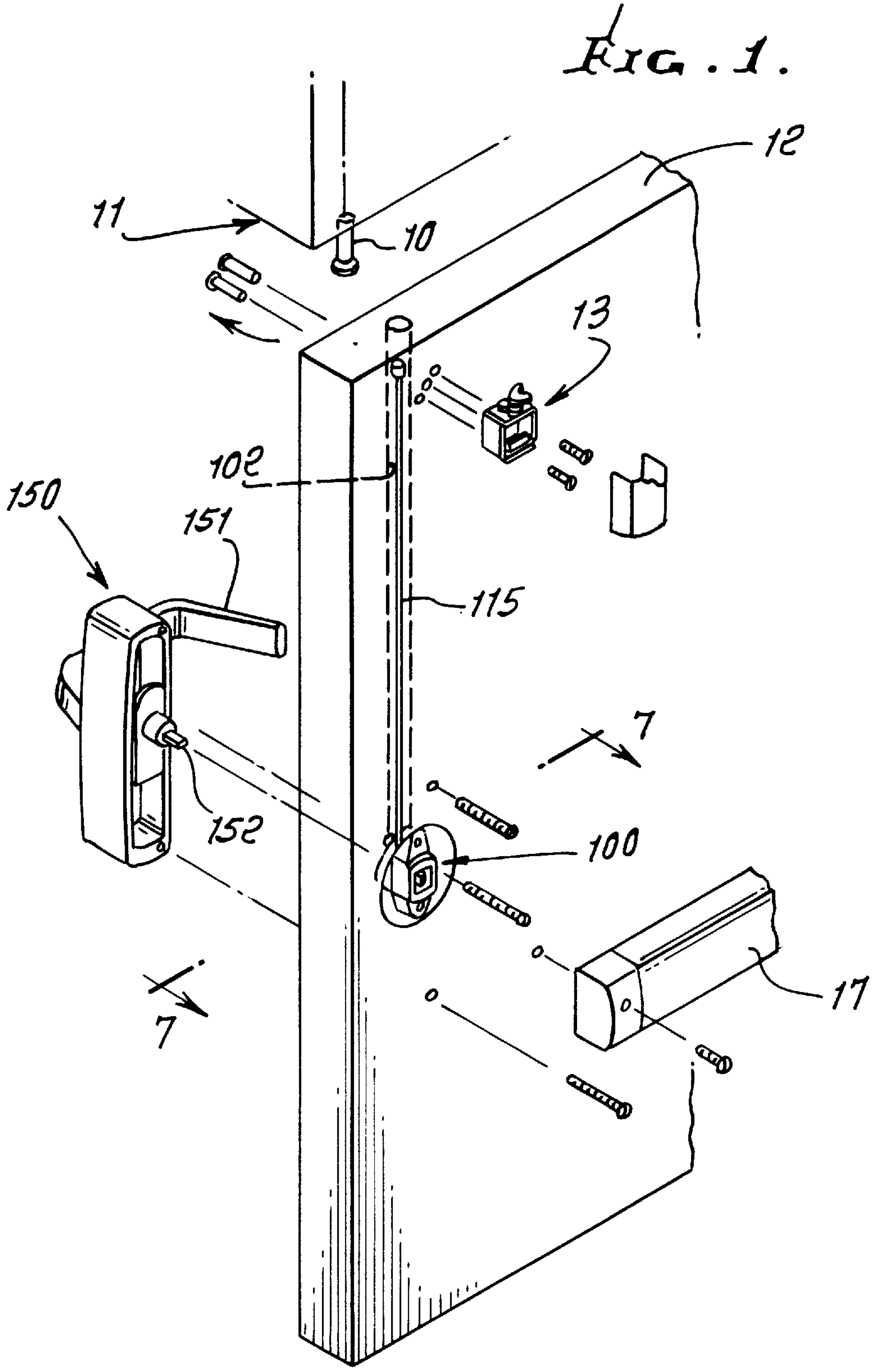
FIG. 1 is a perspective view showing the link mechanism of the invention in relation to a lower level panic bar and an upper level latching structure.

In the drawings, structure is provided for operatively interconnecting an upper latching structure or mechanism 13 carried by the door 12 near its upper end, and a lower actuator means 100 carried by the door at a lower or manually actuating level. A panic bar 17 is shown extending horizontally and is carried by the door. See U.S. Pat. No. 4,368,905, for example, incorporated herein by reference.

In accordance with the invention, a longitudinally elongated link, such as a flexible cable 115, is sized for reception within a passage 102 within the door. Passage 102 and link 115, for example, are concealed from external view, whereby the link is protected from impact with external objects. The link extends into proximity to the upper latching structure 13, and to the lower actuator means 100, and the link is operatively connected to both.

Figure 3:
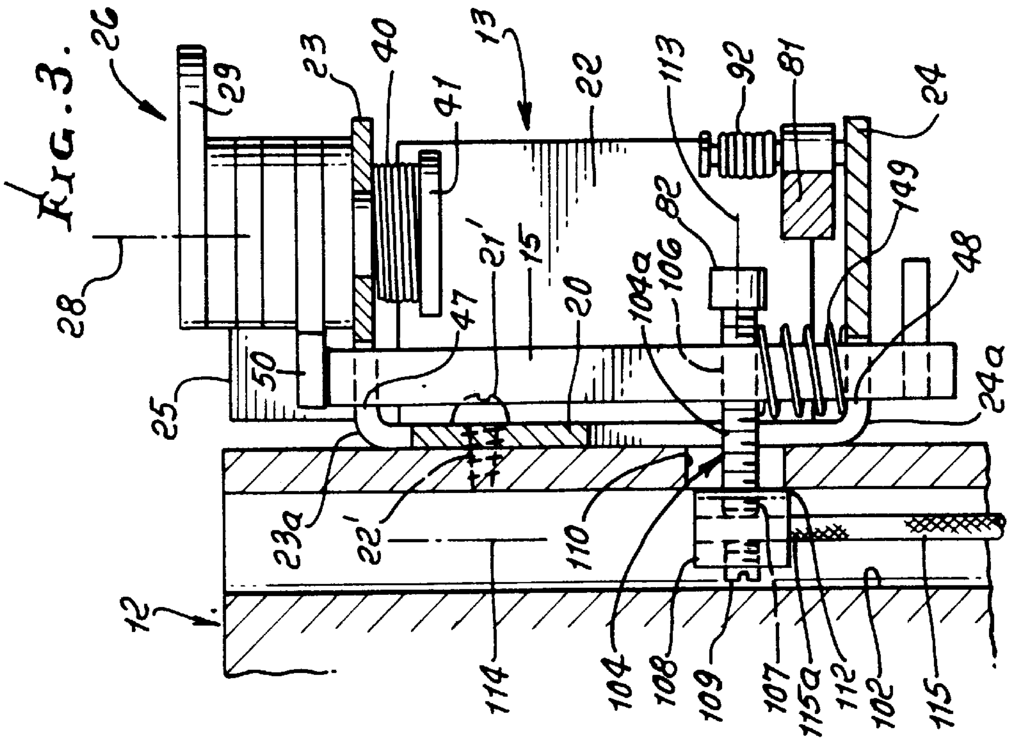
FIG. 3 is a side elevation taken on lines 3—3 of FIG. 2.
Figure 2:
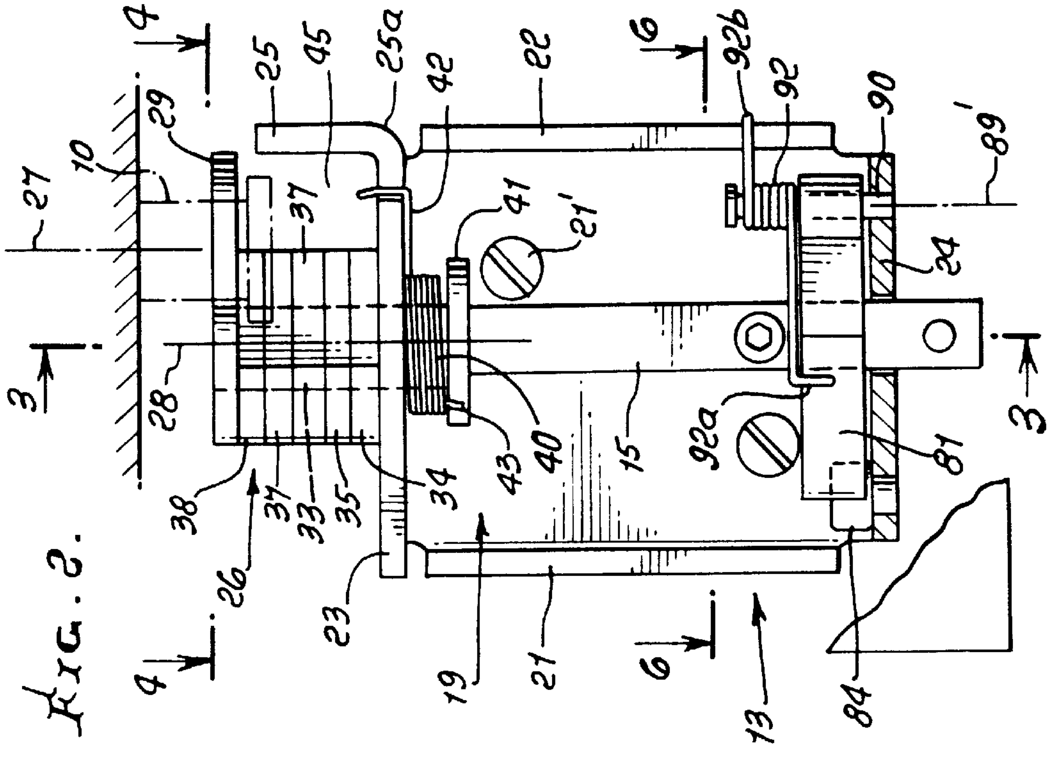
FIG. 2 is a front elevational view of the deadlocking mechanism.

In addition, a laterally extending link is provided at 104, to be attached to the upper end of cable 115, the lateral link 104 connectible to the upper latching structure to transfer longitudinal movement of the concealed cable 115, effected by actuator means 100, to the latching means 13 externally of the door, to operate 13. As shown, lateral link 104 may advantageously comprise a laterally elongated fastener having a threaded shank 104*a,* thread connected at 106 to rod part 15, seen in FIG. 3, and also thread connected at 107 to a sleeve 108 attached, as at 109, to the upper end of 115*a* of cable 115.

Shank 104*a* projects laterally through a side opening 110 in the door, and into vertical bore or passage 102 in the door. The cable 115 and the sleeve 108 are located in that passage, and the sleeve 108 acts as a cable guide, as by sleeve sideward sliding engagement at 112 with the side interior wall of the bore or passage 102, and acting to approximately center the cable in that bore. Such sideward engagement, as at 112, accommodates to any slight angularity of the shank 104*a* relative to an axis 113 normal to the axis 114 of the bore. Fastener 104 is oriented laterally by the vertical rod 15 having slidable bearing engagement at 47 and 48 with arms 23 and 24 of the latching mechanism, acting to orient the rod vertically.

Figure 7:
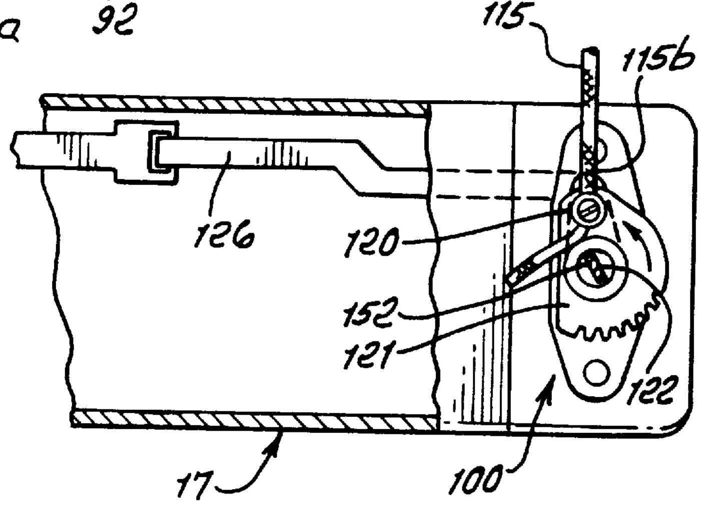
FIG. 7 is an enlarged fragmentary elevation taken on lines 7—7 of FIG. 1.

The lower end extent 115*b* of the cable 115 is typically installed as by its vertical tensioning and adjustable attachment to the lower actuator mechanism 100. See for example FIG. 7 showing a set screw 120 attaching the cable lower end 115*b* to a rotor 121 rotatable about horizontal axis 122, the rotor located within the door (as at 100).

A lever 126, actuated by pushing of panic bar 17, acts to rotate the rotor, and move the locus of set screw 120 downwardly, pushing the cable 115 downwardly, as well as fastener 104 and rod 15, referred to above.

FIG. 1 also shows a door lever mechanism 150 at the outer side of the door and having a lever handle 151 rotatable to rotate a coupling part 152 that rotates the rotor 121.

Referring now to FIGS. 2–6, the mechanism 13 includes a hollow, metallic, box-like body 19 having a side wall 20 attachable to the side of the door 12, as via fasteners 21' receivable through holes 22 in side wall 20. The body also includes upright flanged walls 21 and 22 integral with wall 20 and bent at 90° thereto. Walls 21 and 22 serve to support wall 23 if and when 23 bends downward under load. Further, the body includes top and bottom flanged walls 23 and 24 integral with wall 20, and bent at 900 thereto. See for example bends 23*a* and 24*a.* A further upright wall 25 is integral with top wall 23, and bent upwardly at 25*a,* for purposes as will appear.

A rotary latching means 26 is carried by the body, and typically by top wall 23, to pivot about an axis 28, which extends parallel to the axis 27 of bolt 10, both axes typically extending vertically. The latching means includes a latch 29 in the form of a plate, which is generally C-shaped in horizontal plane, and forms a recess 30 having a C-shaped inner wall 30*a* defined by arms 31 and 32 of the C-shaped latch. The recess 30 is adapted to relatively receive the bolt 10 as the door member closes or pivots relatively toward the plane of the door frame member 11, whereby the bolt engages the inner edge 30*a*' of the arm 31, and forcibly pivots the latch plate about the second axis 28, as referred to, and into FIG. 5 position.

In that position, the bolt is confined by the C-shaped latch 29, and also by the upwardly projecting wall 25, referred to above. Thus, the bolt relatively moves from FIG. 4 position to FIG. 5 position, generally parallel to wall 25. In actuality, the wall 25 moves relative to the bolt, which is typically carried by the fixed position frame member 11.

Pivoting of the latch is accommodated by a pivot shaft 33 carried by the top plate 23 to project upwardly, for spacing the latch 29 well above the top plate 23. Spacers 34–38 are mounted on shaft 33, and confined in stacked relation between 23 and 29, as shown. Other spacers may be employed, such as using one mechanism or spacer only. A predetermined tension torsion spring 40 is located beneath plate 23 and wrapped about shaft 33, to urge, the shaft, latch plate, and spacers in one direction in FIGS. 4 and 5, and toward FIG. 5 position. Thus, as the bolt centers the recess 30, it rotates the latch in the opposite direction, and against the force of the spring, further tensioning the latter. A head 41 on the lower end of the shaft holds the spring between 41 and 23. Torsion spring arm 42 engages the wall 23; and the opposite arm 43 of the spring is attached to the head 41.

Note that the space 45 between the latch plate 29 and the top wall 23 accommodate bolts of different lengths, i.e., that project downwardly to different extents into that space, as the bolt moves relatively into the recess 30 during door closing. Thus, wide tolerance levels for interengaging parts, upon latching and unlatching, are provided for.

A blocking and unblocking part, as in the form of rod 15 previously referred to, extends in cooperating relation with the body 19. As shown, the polygonal cross section rod 15 extends upwardly into the hollow interior of the body, i.e., between walls 21 and 22, as via polygonal (square) cross section guide openings 47 and 48 through the walls 23 and 24. The rod uppermost extent 15*a* in FIG. 5 extends into laterally blocking relation or with a latch dog 50 integral with and projecting radially outwardly of spacer 35, which is rotatably attached to shaft 33, as via engagement therewith at flat area 51.

When the rod extent 15*a* retracts downwardly below the level of the latch dog, as by panic pushing of the bar 17, the spring urges the latch toward FIG. 4 position, suddenly freeing the latch from the bolt, and allowing rapid opening of the door. Also, the force pushing bar 17 accelerates freeing of the latch from the bolt. Alternatively, when the rod upper extent 15*a* engages the dog 50 at 50*a* in FIG. 5, the door is positively latched to the bolt 10.

Figure 4:
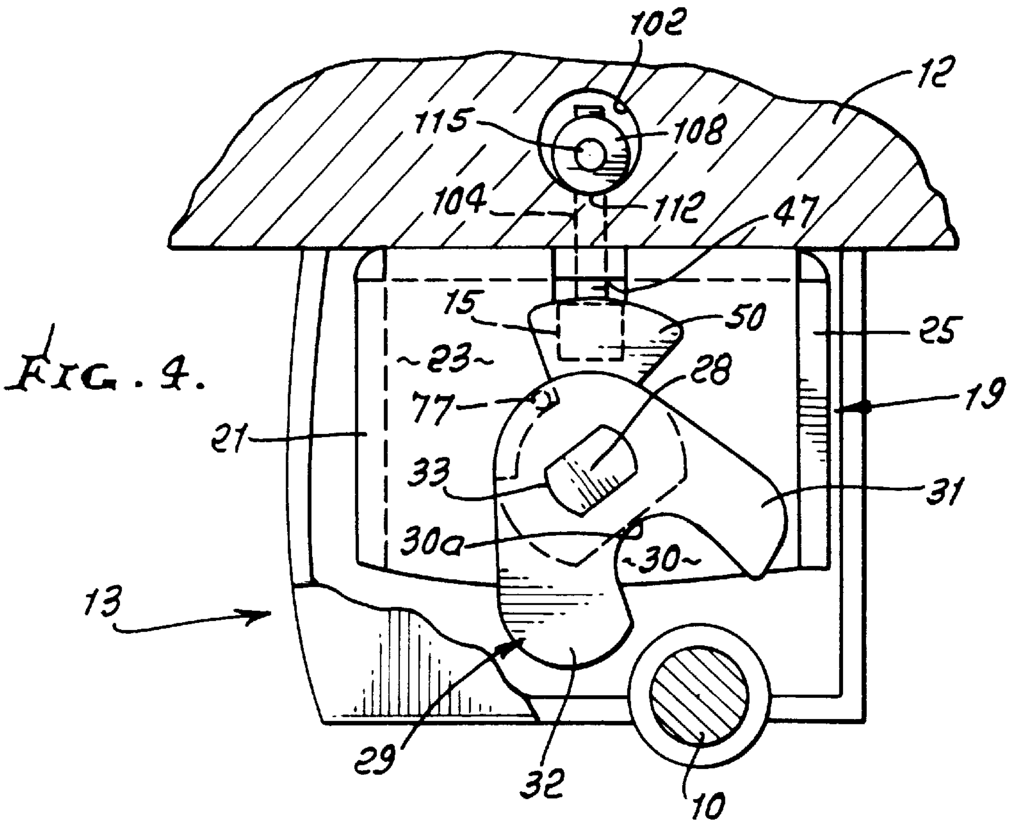
FIG. 4 is a top plan view on lines 4—4 of FIG. 2.
Figure 5:
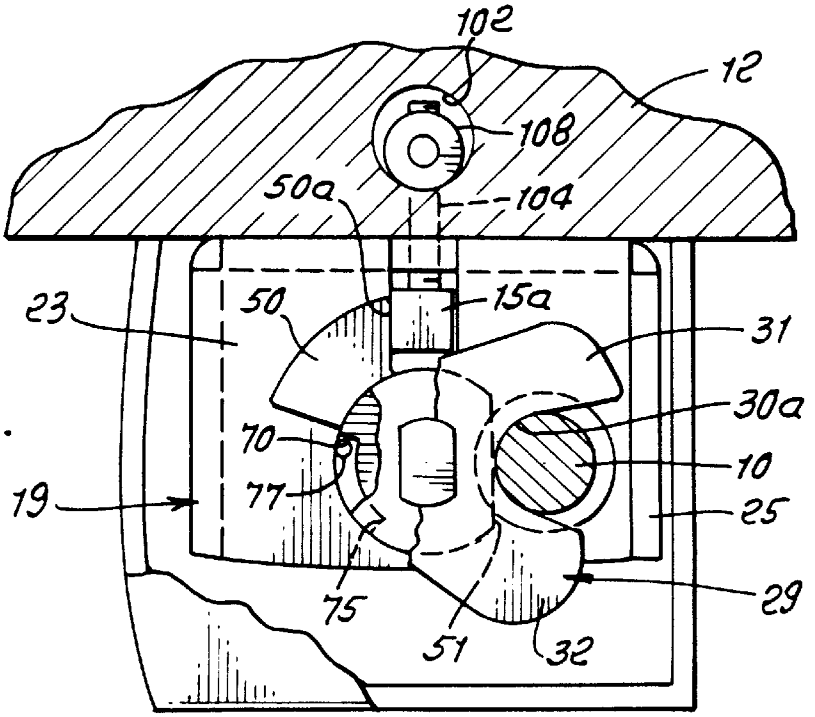
FIG. 5 is a view like FIG. 4 showing a bolt in captivated position.

The plate 34 defines two angularly spaced stops or stop shoulders 70 and 75 (see FIG. 5), alternately engageable with a stop pin 77 integral with top wall 23, thereby to limit rotation of the latch at FIG. 4 and FIG. 5 positions.

Figure 6:
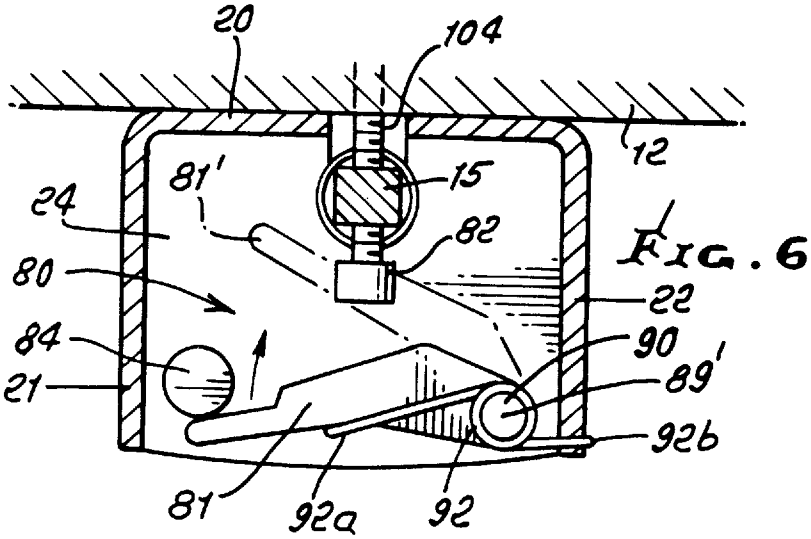
FIG. 6 is a section on lines 6—6 of FIG. 2, and showing details of a heat fusible rod movement blocking device.

As shown in FIG. 6, temperature responsive blocking means is provided at 80, in association with the latch mechanism, to block operation of the latch to unlatch the door, in response to a predetermined increase in ambient temperature. Device 80 operates to project a blocking part from stored or retracted position, indicated at 81, to extended position, indicated by broken lines 81', in which it projects beneath a head 82 on the lateral link 104, preventing dropping or lowering of the rod 15, and thereby preventing unlatching of the mechanism that would otherwise allow opening of the door. This is desired in case of fire, since a closed door blocks the spread of the flames.

The latch mechanism parts and the rod typically consist of steel to resist melting during a fire. Device 80 is indicated generally in FIG. 6, to represent a family or class of usable temperature responsive devices that would prevent rod dropping, i.e., endwise rod movement that would effect unlatching.

The particular temperature responsive blocking device 80, within the family of such devices, as referred to, is preferred. As shown, it includes a spring-urged element in the form of an arm 81 pivotally mounted on bottom wall 24, to swing about upright axis 89'. A heat-fusible part 84 normally blocks spring-urged movement of the arm 81 into a position beneath head 82 on the link 104. In that arm released position, indicated by broken lines 81' in FIG. 6, the arm blocks rod 15 downward movement that would otherwise release the door. The panic bar may be melted by the fire, along with cable 115 (see FIG. 1); however, the rod 15 does not then drop, as by gravity, to unlatch the latch, since the arm 81, released by melting of part 84, then extends beneath link head 82, to prevent rod 15 dropping.

Fusible part 84 may consist of plastic (synthetic resin) that melts at elevated temperatures, such as temperature above 500° F., encountered during a fire. Part 84 is shown as a cylinder having a stem received in an opening in bottom wall 24, whereby the cylinder extends in front of the tip of arm 81 to prevent its swinging about axis 89'. The arm has a pivot axle 90 also received in an opening in wall 24.

A torsion spring 92 is wound about an upward extension of the axle, and urges the arm clockwise in FIG. 6. See torsion spring end 92*a* bearing against the arm 81, and end 92*b* bearing against wall 22.

The method of interconnecting the latch mechanism 13 and the actuator means 17 includes first connecting the flexible cable 115 to the latch mechanism 13, as for example via rod 15 and a transverse link 104; and then tensioning the cable downwardly and connecting it to the actuator means 17, as for example via rotor 121. The cable is installed in passage 102 prior to such tensioning. Note in FIG. 3 that coil spring 149 urges link 104 upwardly, to tension the cable 115.

Figure 8:
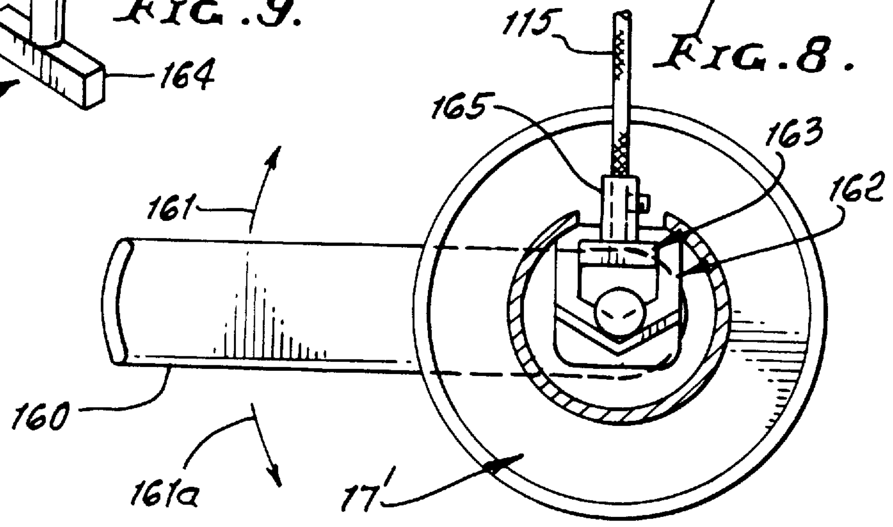
FIG. 8 is a section showing an alternative lower actuator.

FIG. 8 shows an alternative lower actuator means 17', including a manually actuatable lever 160 rotatable in the direction of arrows 161 and 161*a,* and a cam mechanism 162 rotatable by the lever to move cable 115 lower end fitting 163 manually or downwardly.

Figure 9:
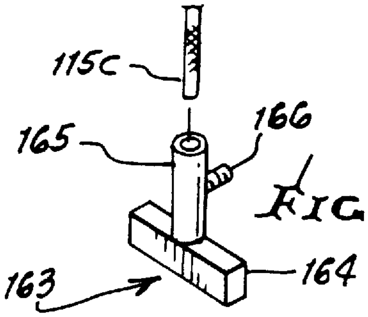
FIG. 9 is a perspective view of a cable connection, as used in FIG. 8.

FIG. 9 shows fitting 163 to include a base 164, and an upright sleeve 165 to receive the lower end 115*c* of the cable. A set screw 166 retains the cable lower end to the sleeve.

Link 15 may comprise a rod instead of a cable.

We claim:

1. The method of providing and installing door latching structure for operatively interconnecting an upper latching structure carried by the door and a lower actuator means carried by the door, the upper latching structure located outside the door, that includes:

a) providing a vertically elongated passage concealed within the door and a longitudinally elongated link located within said door passage and extending into proximity to said latching structure, and to said actuator means, said link operatively connected to said actuator means, b) and providing a laterally extending link attached to an upper end portion of said longitudinally elongated link, for bodily movement therewith, said laterally extending link extending from the interior of said door passage to the exterior thereof via a side port in the door for connection to said latching structure to transfer longitudinal movement of the longitudinal link effected by said actuator means to said latching structure, for operating same.

2. The method of claim 1 wherein said longitudinally elongated link is provided in the form of a cable.

3. The method of claim 1 wherein said longitudinally elongated link is provided in the form of a rod.

4. The method of claim 1 including providing heat-responsive means associated with said upper latching structure to independently control operation of the latching structure in response to a predetermined change in temperature.

5. The method of claim 4 wherein said heat-responsive means is provided to include a spring-urged element, and a heat fusible part blocking spring-urged movement of the element into a position to block latching structure movement that would unlatch the door.

6. The method of claim 1 including providing said actuator means to include a push bar actuator.

7. The method of claim 1 wherein said actuator means is provided to include a panic bar carried by the door to have operative connection to said longitudinally extending link, for displacing said longitudinally extending link up and down.

8. The method of claim 1 wherein said upper latching structure is provided to be rotatable in one rotary direction into latching relation with a bolt, and in the opposite rotary direction out of bolt latching relation.

9. The method of claim 8 including providing and locating a spring for urging said upper latching structure in said opposite rotary direction.

* * * * *